UNITED STATES PATENT OFFICE.

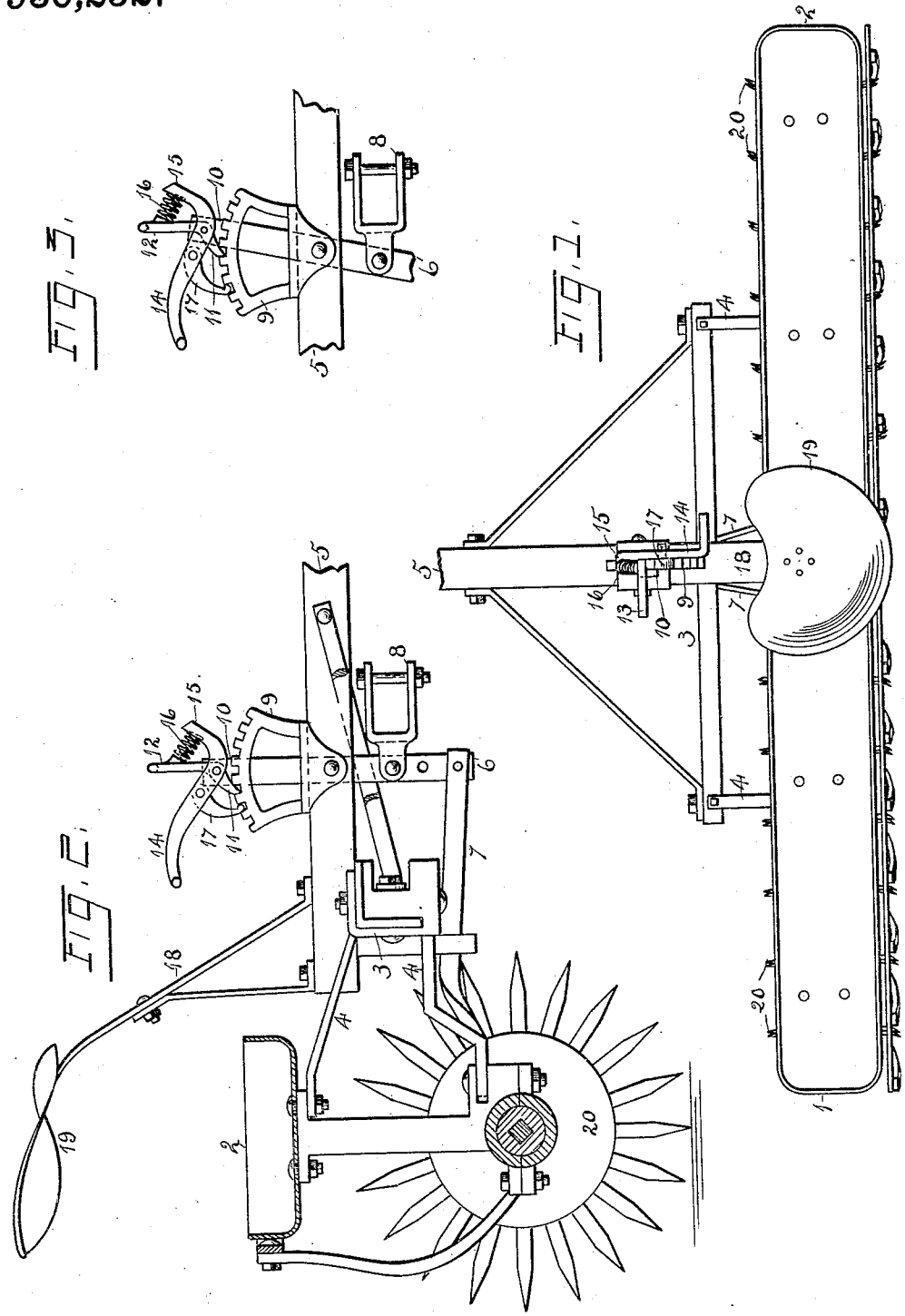

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

REVOLVING HARROW.

No. 930,252.   Specification of Letters Patent.   Patented Aug. 3, 1909.

Application filed May 1, 1908. Serial No. 430,376.

*To all whom it may concern:*

Be it known that I, LEWIS E. WATERMAN, a citizen of the United States, residing at Rockford, in the county of Winnebago and State of Illinois, have invented certain new and useful Improvements in Revolving Harrows, of which the following is a specification.

The object of this invention is to provide a manually operated means for angling the gang sections of a revolving harrow, and connections whereby the team may straighten the sections or place them in alinement.

In the accompanying drawings, Figure 1 is a plan view of a revolving harrow containing my improvements. Fig. 2 is a vertical transverse section through one of the gangs, the frame and parts supported thereby not sectioned. Fig. 3 is an elevation of the means for moving the gang sections with relation to one another.

The revolving harrow herein shown, in the main is of a well known construction and comprises the two gang sections 1 and 2 supporting the main frame 3, by the connecting bars 4. These bars form a pivotal connection between the main frame and gang sections. A tongue 5 is supported by the main frame. A rock-bar is pivotally supported by the tongue, and to its lower end 6 are pivoted two bars 7, the rear ends of which have the usual connections with the inner ends of the gang sections. To the lower portion 6 of this rock-bar is pivoted a draft attachment 8, and is made bodily adjustable in the lengthwise direction of the rock-bar.

To the tongue 5 is secured a toothed segment 9, and adjacent to which is located the upper portion 10 of the rock-bar. To the upper end of the rock-bar is pivoted a dog 11 having an upwardly extending section 12, and from the end of the section extends a side projection forming a foot lever 13.

To the upper end 10 of the rock-bar and on the same pivot to which the dog 11 is pivoted, is pivoted a foot-lever 14 having an upturned end 15, and a spring 16 is located between this upturned end 15 and the foot-lever 13.

To the foot-lever 14 is pivoted a dog 17, the free end of which is adapted to engage the teeth of the toothed segment 9. The dog 11 is also adapted to engage the teeth of the toothed segment 9.

A seat support 18 is secured to the rear end of the tongue 5, and a seat 19 is connected to the support. The seat is so located that the driver seated therein can with his feet reach the foot-levers 13 and 14.

When the parts are in the position shown at Fig. 2, the dogs 11 and 17 rest against the teeth of the toothed segment 9. By pressing down on the foot lever 14, the dog 17 resting against a tooth will act as a fulcrum and force the upper end of the rock-bar ahead carrying the dog with it until the dog 11 drops into another notch ahead, which will prevent the rock-bar moving rearward. Upon releasing the foot-lever 14 the spring 16 will raise the foot-lever 14 and carry the dog 17 another notch ahead. This movement of the foot-lever 14 will move the rock-bar ahead until the dog 11 is in the forward notch which will move the lower end 6 of the rock-bar rearward, thereby moving the inner ends of the gang sections rearward into working position. By this arrangement the gangs can be adjusted with relation to one another to angle the toothed heads more or less across the line of draft as circumstances may require. By the driver placing his foot against the foot-lever 13 and moving it forward, the dog 11 will be disengaged from the teeth of the toothed segment 9, and by further depressing the foot-lever 13, the dog will engage the dog 17 and raise it free of the toothed segment, and hold it in this position. The team by pulling on the clevis 8 will move the rock-bar on its pivotal support which, through the bars 7 will move the gang sections into alinement as shown at Fig. 1. This arrangement leaves the hands of the driver free to manage the team, and the driver has only to angle the gangs, their straightening being accomplished by the team.

Each gang section 1 and 2 is made up of a series of toothed heads 20 which enter the ground and loosen the weeds from around the roots of the stalks of alfalfa or clover.

I claim as my invention.

In a revolving harrow, the combination of a frame, two gang sections pivotally connected with the frame, a toothed segment, a pivoted bar, a dog pivotally connected with the upper end of the bar and terminating in a foot-lever, another foot-lever pivoted to the upper end of the bar and having an upturned end, a dog pivoted to this foot-lever, a spring located between the upturned end and the first foot-lever, both dogs adapted to engage the teeth of the toothed segment, a draft connection with the pivoted bar, and connections between the pivoted bar and the gang sections.

In testimony whereof I have hereunto set my hand in presence of two subscribing witnesses.

LEWIS E. WATERMAN.

Witnesses:
  A. O. BEHEL,
  E. D. E. N. BEHEL.